United States Patent

[11] 3,597,631

[72] Inventor George H. Fathauer
Decatur, Ill.
[21] Appl. No. 761,088
[22] Filed Sept. 20, 1968
[45] Patented Aug. 3, 1971
[73] Assignee The Dale Valve Company
Norton Grove, Ill.

[54] FIRING-ANGLE CONTROL CIRCUIT
9 Claims, 1 Drawing Fig.

[52] U.S. Cl. .......... 307/252 N, 307/235, 328/146, 328/155
[51] Int. Cl. .......... H03k 17/00, H03k 5/20
[50] Field of Search .......... 307/235, 228, 252, 252.70, 252.74; 328/146, 147, 150, 155; 330/69, 30

[56] References Cited

UNITED STATES PATENTS

| | | | |
|---|---|---|---|
| 2,914,685 | 11/1959 | McVey | 307/228 |
| 3,165,675 | 1/1965 | Shapiro | 328/147 |
| 3,281,673 | 10/1966 | Richardson | 307/235 |
| 3,310,688 | 3/1967 | Ditofsky | 307/235 |
| 3,474,258 | 10/1969 | Nagy | 328/146 |

*Primary Examiner*—Donald D. Forrer
*Assistant Examiner*—David M. Carter
*Attorney*—Hill, Sherman, Meroni, Gross & Simpson

ABSTRACT: A firing-angle control circuit having means for generating a ramp control voltage and for utilizing an electronic switching means to compare the ramp voltage with the instantaneous value of an error signal. Whenever an error signal bears a predetermined relationship to the instantaneous amplitude of the ramp signal, the switching means is deenergized and the signal source is coupled to the load. The ramp control voltage is phase related to the signal source, and hence the comparison between the ramp voltage and the source signal provides a means for controlling the firing angle of a switching means which regulates the application of the source to the load.

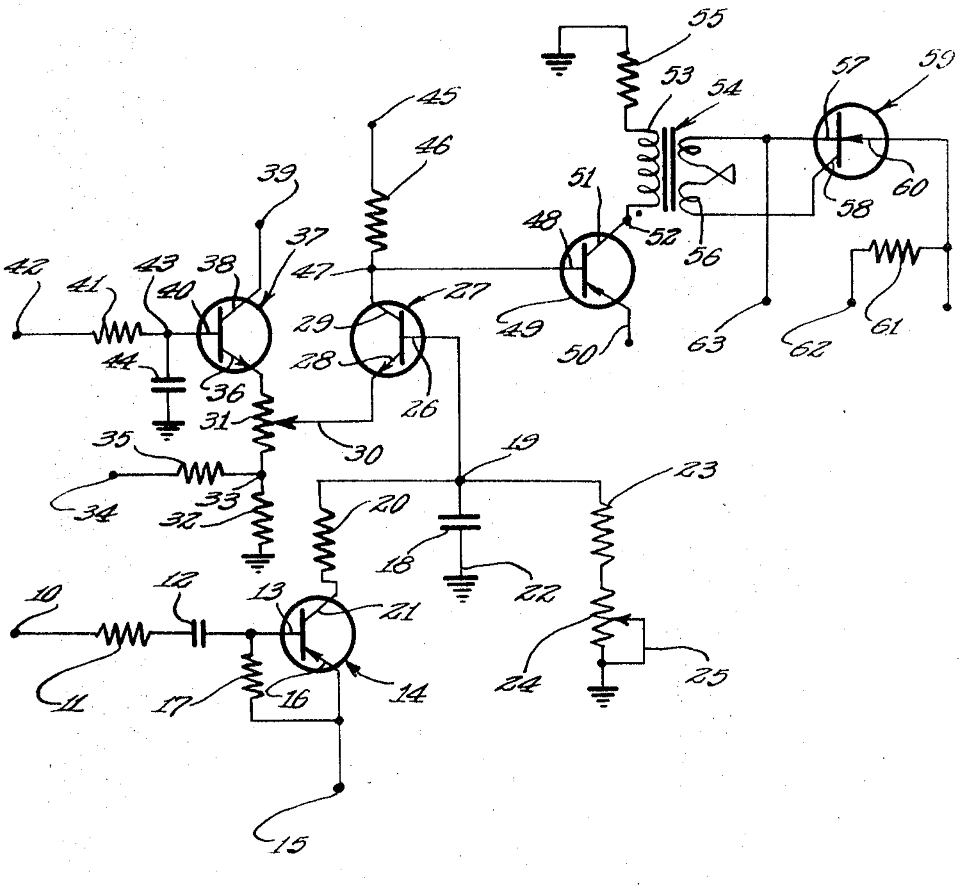
INVENTOR.
George H. Fathauer
BY Hill, Sherman, Meroni, Gross & Simpson ATTORNEYS

FIRING-ANGLE CONTROL CIRCUIT

BACKGROUND OF THE INVENTION

Field of the Invention

The present invention relates to a firing-angle control circuit and particularly to a servo circuit which senses an error signal and compares the same with a ramp voltage which is generated to regulate the firing point in each cycle of a signal source being applied to a load.

SUMMARY OF THE INVENTION

It is an important feature of the present invention to provide a novel firing-angle control circuit.

It is also a feature of the present invention to provide a firing-angle control circuit which increases the firing angle of a signal being controlled in response to increases in the level of an error signal.

It is an important object of the present invention to provide a firing-angle control circuit which utilizes a first electronic switching means to develop a pulse, and which has an integrating circuit coupled to the output of said switching means to generate a ramp-type voltage for comparison with an error signal to control the firing angle of a signal source.

It is another object of the present invention to provide a firing-angle control circuit which utilizes an electronic switching means to compare the instantaneous amplitudes of a ramp signal with an error signal, and to generate a response whenever a given predetermined relationship is established between the two indicated signals for controlling the firing angle of a signal source being applied to a load.

It is also an object of this invention to provide a firing-angle control circuit which utilizes a first electronic switching means which switching means is actuated by a signal associated with the signal source being applied to a load and which develops at the output thereof, a ramp voltage which ramp voltage is initially at a maximum, and which decreases to a minimum at a substantially uniform rate. In this way, the ramp voltage is utilized as a sweep signal to determine the firing angle of the signal source being applied to a load.

It is further object of this invention to provide a firing-angle control circuit utilizing a first transistor to generate a ramp voltage at the output thereof, and a second transistor wherein the ramp voltage is applied to the base of the second transistor, and wherein an error signal is coupled to one of the other terminals of the second transistor such that a response is generated when the error signal exceeds a given proportion of the instantaneous magnitude of the ramp voltage.

It is also an object of this invention to provide a firing-angle control circuit as described above, wherein the signal source being applied to a load is controlled by an SCR, and wherein the SCR is rendered conductive in response to a comparison between the error signal and the ramp signal.

These and other features and advantages of the present invention will be understood in greater detail from the following description and the associated drawing wherein reference numerals are utilized to designate a preferred embodiment.

BRIEF DESCRIPTION OF THE DRAWING

The drawing in the present application illustrates a schematic of a firing-angle control circuit utilizing all of the above-described advantages associated with the present invention.

DESCRIPTION OF THE PREFERRED EMBODIMENT

In servosystems a load is energized and carries out a required function and means are provided to generate an error signal to the extent that the load deviates from a prescribed performance. For instance, if material is being fed to a scale and a given weight on the scale corresponds to a given voltage output, the extend that this voltage output deviates from a preset voltage is the error signal. The magnitude of the error signal is then indicative of the additional material required to be fed to the scale in order to satisfy the preset requirements.

Accordingly, a servosystem must provide a means to detect the error signal and to adjust the power delivered to the load (in the above example to the material feeding apparatus).

One way to adjust the total power is to control the portion of each cycle which is delevered to the load, in other words, to control the firing angle of a switching circuit which switches on and off during each cycle of an input-energizing signal.

For example, if the signal delivered to a switching means which control the application of power to a load takes the form of a sine wave, the amount of power delivered to the load can be varied by varying the point at which conduction through the load occurs from 0° to 180°. At 0° firing angle the power would be a maximum and at 180° firing angle the power would be a minimum. By controlling the angle of conduction between 0° and 180° the total power delivered to the load can be controlled.

Referring specifically to the schematic shown in the drawing, a 60-cycle line signal may be coupled to an input terminal 10 and applied through a resistor 11 and capacitor 12 to a base connection 13 of a switching transistor 14. A DC signal is coupled to a terminal 15 which in turn is connected to an emitter connection 16 of the transistor 14. A resistor 17 provides bias for the transistor 14.

A capacitor 18 is coupled in parallel with transistor 14 and in particular has a first terminal 19 connected through a resistor 20 to an emitter connection 21 of the transistor 14 and has a second terminal 22 coupled to ground as shown. A resistor 23 and a series-connected resistor 24 are connected in parallel with the capacitor 18. The resistor 24 is adjustable as at 25.

Assuming the voltage at the terminal 10 to be in phase with the line voltage being applied to the load, the negative voltage peak of the AC signal will be developed at the base 13 of the transistor 14. The resistor 11 and capacitor 12 provide a phase shift to effect the proper time relationship between the ramp and the line voltage being applied to the load.

The turning on of the electronic switching device, or transistor 14, places the DC voltage (such as +9 volts) of the terminal 15 substantially directly across the capacitor 18. When the switch 14 turns off, the capacitor 18 discharges through a path which includes resistors 23 and 24. The time constant of the discharge path may be regulated such that the resulting ramp signal may decay from a peak of 9 volts, for instance, to a minimum of 4 volts. The time constant may be adjusted by moving the movable tap 25, of the resistor 24, and thereby affecting the minimum voltage which would appear at the terminal 19.

Accordingly, a ramp voltage is developed at the terminal 19 which sweeps from approximately 9 volts to approximately 4 volts for the duration of the positive half-cycle of the signal being applied to the load. This sweep signal is applied to a base connection 26 of a second electronic switching means or transistor 27. The transistor 27 has an emitter connection 28 and a collector connection 29. The emitter connection 28 is couple to a movable tap 30, of a resistor 31. The resistor 31 is grounded through a second resistor 32 as shown. A terminal 33 is coupled between the resistors 31 and 32, a DC signal is applied to a terminal 34 and is coupled to the junction point 33 through a resistor 35.

The resistor 31 is coupled to an emitter 36 of a further transistor 37. The transistor 37 has its collector 38 coupled to a DC signal at a terminal 39. The transistor 37 has its base connection 40 coupled through a resistor 41 to a terminal 42 which is the input for the error signal as described above. A junction point 43 is provided between the resistor 41 and the collector connection 40 of the transistor 37 and a capacitor 44 is coupled from the junction point 43 to ground as shown.

Essentially, if the error signal as applied to the terminal 42 is less than the 4-volt minimum which is developed at the base 26 of the transistor 27, the transistor 37 will remain in a cutoff state. With transistor 37 cutoff, transistor 27 will remain in a conducting state with the result that minimum power will be delivered to the load.

If the error signal applied to the terminal 42 is 9 volts or greater, for instance, then the transistor 37 will remain on for the entire conduction cycle, as the sweep voltage at the base of the transistor 26 will at no time exceed the base voltage of the transistor 37. Accordingly, the load will be energized for a maximum time or 180° of the conduction cycle.

If the error signal as applied at the terminal 42 should have an amplitude which is between the minimum of 4 volts and the maximum of 9 volts, the transistor 27 will be turned off only during that portion of the sweep which is less than the voltage developed at the terminal 42. In other words, if the voltage at the terminal 42 is, for example, 6 volts, the sweep at the base 26 of the transistor 27 will decay uniformly from 9 volts to 4 volts. After the sweep signal decreases to a point which is less than 6 volts, the transistor 27 will be cutoff thereby energizing the load for the remaining portion of the conduction cycle. In this way the firing angle is determined by the comparison of the instantaneous magnitudes of the sweep signal as applied at the base 26 and the instantaneous error signal as developed at the terminal 42. Of course, the relative magnitudes of the signals as developed at the terminal 42 and at the base 26 may be altered due to the biasing respective transistors. Also, the movable tap 30 provides an adjustment for the maximum voltage which when applied at the terminal 42 will result in a turnoff signal for the transistor 27 and hence the start of the firing portion of a conduction cycle.

The collector 29 of the transistor 27 is energized by a DC signal which is applied to a terminal 45 through a resistor 46. The collector 29 is coupled to a junction point 47 which in turn is coupled to a base 48 of a transistor 49. The transistor 49 has an emitter 50 to which is applied a DC signal source and a collector 51 which is coupled to a terminal 52. The terminal 52 is coupled to primary winding 53 of a transformer 54. A resistor 55 is coupled from the opposite terminal of the primary 53 to ground as shown.

The transformer 54 has a secondary 56 which is coupled between a cathode 57 and a gate 58 of an SCR 59. The SCR 59 has an anode 60 which is connected as shown.

A load 61 which, for example, may be a motor for driving a conveyor for feeding materials to a scale is coupled from the anode 60 of the SCR 59 to a line terminal 62. The other terminal 63 of the line may be coupled to the cathode of the SCR 59. In this way, the firing of the SCR corresponds to energization of the load 61.

As has already been mentioned, when the error signal as applied at the terminal 42 exceeds the instantaneous value of the sweep signal as developed at the base 26, the transistor 27 is turned off. The turning off of the transistor 27 corresponds to a turning off of the transistor 49 which then generates a signal through the transformer 54 to fire the SCR 59. The firing of the SCR 59 energizes the load 61. Accordingly, as the error signal increases the firing angle of the SCR 59 is increased, thereby increasing the feed of materials to a scale or the like which then results in a decrease of the error signal applied to the terminal 42 in a well-understood manner.

While various modifications and combinations of the features of my invention may be accomplished by those skilled in the art, I desire to claim all such modifications and combinations as properly come within the spirit and scope of my invention as claimed herein.

I claim as my invention:

1. A control circuit for regulating the firing angle of an energizing source in response to variations in an error signal comprising:
means for generating a control voltage having an amplitude which varies continuously over a portion of a cycle of said energizing source,
an electronic switching means having first and second inputs and an output,
means for coupling said control voltage to one of said inputs,
means for coupling said error signal to the other of said inputs,
said electronic switching means comparing said first and second inputs and generating an output in response to a difference therebetween,
a load,
triggering means to control the angle of conduction of a signal coupled to the load, and
means responsive to the output of said electronic switching means to control the operation of said triggering means.

2. A control circuit in accordance with claim 1 wherein said means for generating a control voltage comprises:
means for generating a substantial ramp voltage having an amplitude which varies at a substantially constant rate.

3. A control circuit in accordance with claim 2 wherein said ramp voltage has an initial maximum amplitude and decreases at a substantially constant rate to a terminal minumum amplitude.

4. A control circuit in accordance with claim 3 wherein said means for generating said control voltage comprises:
a further electronic switching device having first and second inputs and an output,
an AC signal associated with said energizing source being coupled to said first input,
a DC signal being coupled to said second input, and
means coupled to said output for developing a decaying signal in response to the energizing of said further electronic switching device.

5. A control circuit in accordance with claim 4 wherein said means for developing a decaying signal comprises a parallel RC network.

6. A control circuit in accordance with claim 1 wherein said triggering means includes a three-terminal negative-resistance electronic device.

7. A control circuit for regulating the firing angle of an energizing source in response to variations in an error signal comprising:
a first electronic switching means having associated first and second inputs and an output,
an AC signal associated with said energizing source being coupled to said first input, a DC signal being coupled to said second input and a decaying signal means being coupled to said output,
a second electronic switching means having associated first and second inputs and a output,
a firing circuit for controlling the angle of conduction of a signal coupled to the load,
means for coupling the output of said decaying signal means to one of said inputs of said second electronic switching means,
means for coupling the error signal to the other of said inputs, said second electronic switching means comparing the error signal and the decaying signal and having means for coupling the output thereof to said firing circuit,
said firing circuit controlling the duty cycle of said energizing source, and
said firing circuit including a control terminal being energizable by the change of state of said second electronic switching means, and controlling the firing angle of said firing circuit.

8. A control circuit in accordance with claim 7 wherein said first electronic switching means generates a pulse and wherein said pulse is integrated by said decaying circuit to provide a ramp signal at the input of said second electronic switching means.

9. A control circuit in accordance with claim 8 wherein means are provided at said second electronic switching means to compare a function of said error signal with the instantaneous level of said ramp signal to thereby control the duty cycle of said energizing source.